US012755173B1

(12) United States Patent
Eliyahu et al.

(10) Patent No.: US 12,755,173 B1
(45) Date of Patent: Oct. 6, 2026

(54) SECURE EXPLANATION GENERATION BY LARGE LANGUAGE MODELS FOR SENSITIVE SEARCH TARGETS

(71) Applicant: Intuit Inc., Mountain View, CA (US)

(72) Inventors: Natalie Bar Eliyahu, Petah Tikva (IL); Shon Mendelson, Petah Tikva (IL); Itay Hazan, Petah Tikva (IL); Sigalit Bechler, Petah Tikva (IL); Noa Haas, Petah Tikva (IL); Ron Bitton, Or-Yehuda (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/372,199

(22) Filed: Oct. 28, 2025

(51) Int. Cl.
*G06N 5/04* (2023.01)
*G06N 5/045* (2023.01)

(52) U.S. Cl.
CPC .................................... *G06N 5/045* (2013.01)

(58) Field of Classification Search
CPC ...................................................... G06N 5/045
See application file for complete search history.

(56) References Cited

U.S. PATENT DOCUMENTS

2025/0045317 A1* 2/2025 Hemington ........... G06F 16/355
2025/0111169 A1* 4/2025 Srinivasan ............... G06N 3/08
2025/0165444 A1* 5/2025 Rahimov .............. G06F 16/215
2025/0284805 A1* 9/2025 Hen ....................... G06F 21/554
2025/0307418 A1* 10/2025 Spencer ................ G06F 21/577
2025/0335433 A1* 10/2025 Kulkarni ............... G06F 16/252
2025/0371433 A1* 12/2025 Bhat .......................... G06F 8/41
2025/0384072 A1* 12/2025 Bhat ..................... G06F 16/338

OTHER PUBLICATIONS

Feretzakis, "Trustworthy AI: Securing Sensitive Data in Large Language Models", AI, 2024 (Year: 2024).*
Dong, "Safeguarding large language models: a survey", AI Review Oct. 17, 2025. (Year: 2025).*

* cited by examiner

*Primary Examiner* — Dave Misir
(74) *Attorney, Agent, or Firm* — Lathrop GPM LLP

(57) ABSTRACT

A method includes generating, by a large language model (LLM), a multitude of match explanations for a multitude of search targets. The multitude of match explanations is clustered to obtain a multitude of explanation clusters. An explanation template is generated for an explanation cluster. The explanation template includes a static portion and a dynamic portion. A multitude of explanation templates is obtained in this manner. A target match for a search target received from a user application is obtained. A corresponding match explanation is generated by the LLM for the target match. An encoding of the corresponding match explanation is matched to a multitude of encoded templates corresponding to the multitude of explanation templates. Responsive to the encoding matching an encoded template a small language model (SLM) populates the corresponding match explanation from the search target.

18 Claims, 5 Drawing Sheets

SECURE EXPLANATION GENERATION BY LARGE LANGUAGE MODELS FOR SENSITIVE SEARCH TARGETS

BACKGROUND

Large language models (LLMs) have advanced capabilities across a wide range of tasks. For domain-specific problems involving proprietary or sensitive data, LLMs may be fine-tuned using internal datasets. LLMs fine-tuned in this manner may demonstrate improved accuracy and relevance of generated output when applied to domain-specific problems. However, a significant security risk may be introduced, namely, the possibility that the fine-tuned LLM may inadvertently expose sensitive data during inference. Fine-tuning may pertain to training inputs, but may not be intended for streamlining the generative output of the LLM.

The security risk is particularly pronounced in applications where the LLM is used not only to make predictions or classifications but also to generate natural language explanations for its outputs. For example, in financial transaction cross-referencing and matching systems, the fine-tuned LLM may be tasked with identifying matches between bank transactions and accounting records, and then explaining the rationale behind each match. If the explanation includes sensitive customer data learned during fine-tuning, it may violate privacy boundaries and expose confidential information to unauthorized users. Additionally, if the LLM is not constrained in generating the explanation, the explanation may include anecdotal information regarding similar transactions/matches occurring between third-party users and vendors. The inclusion of anecdotal information pertaining to third-party users/vendors in a response intended for a particular user, breaks the data confidentiality agreement of the third-party users/vendors. On the other hand, the rationale of explanation may turn on sensitive data matches, which authorized users may require to view to validate the explanation. Thus, traditional mitigation strategies, such as data de-identification may compromise accuracy.

SUMMARY

In general, in one aspect, one or more embodiments relate to a method. The method includes generating, by a large language model (LLM), a multitude of match explanations for a multitude of search targets. The method further includes clustering the multitude of match explanations to obtain a multitude of explanation clusters. The method further includes generating an explanation template for an explanation cluster of the multitude of explanation clusters. A multitude of explanation templates is obtained in this manner. The method further includes obtaining a target match for a search target received from a user application. The method further includes generating, by the LLM, a corresponding match explanation for the target match. The method further includes matching an encoding of the corresponding match explanation to a multitude of encoded templates corresponding to the multitude of explanation templates. Responsive to the encoding matching an encoded template of the multitude of encoded templates, the method further includes populating, by a small language model (SLM), the corresponding match explanation from the search target.

In general, in one aspect, one or more embodiments relate to a system. The system includes a computer processor, and a large language model (LLM), executing on the computer processor. The system further includes a small language model (SLM), executing on the computer processor. The system further includes a topic analysis model, executing on the computer processor. The system further includes a secure explanation engine, executing on the computer processor, interfacing with the LLM, the SLM, and the topic analysis model. The secure explanation engine is configured for generating, using the LLM, a multitude of match explanations for a multitude of search targets. The secure explanation engine is further configured for clustering, using the topic analysis model, the multitude of match explanations to obtain a multitude of explanation clusters. The secure explanation engine is further configured for generating, using the LLM, an explanation template for an explanation cluster of the multitude of explanation clusters. A multitude of explanation templates is obtained in this manner. The secure explanation engine is further configured for obtaining, by a matching model of the secure explanation engine, a target match for a search target received from a user application. The secure explanation engine is further configured for generating, using the LLM, a corresponding match explanation for the target match. The secure explanation engine is further configured for matching an encoding of the corresponding match explanation to a multitude of encoded templates corresponding to the multitude of explanation templates. Responsive to the encoding matching an encoded template of the multitude of encoded templates, the secure explanation engine is further configured for populating, using the SLM, the corresponding match explanation from the search target.

In general, in one aspect, one or more embodiments relate to a method. The method includes performing, in an offline phase, operations including obtaining a multitude of search targets from a user application. The operations further include obtaining, using a matching model, a multitude of target matches corresponding to the multitude of search targets. The operations further include generating for a target match, by a large language model (LLM), a match explanation. The match explanation includes a natural language utterance as a static portion, and at least an attribute and corresponding attribute value of a corresponding search target of the target match as a dynamic portion. A multitude of match explanations is obtained in this manner. The operations further include clustering, by a topic analysis model, the multitude of match explanations to obtain a multitude of explanation clusters. The operations further include generating an explanation template for an explanation cluster of the multitude of explanation clusters. The explanation template includes the natural language utterance as the static portion, and a placeholder corresponding to the attribute and the corresponding attribute value as the dynamic portion. A multitude of explanation templates is obtained in this manner. The operations further include storing the explanation templates in a data repository.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a method for generating security-aware explanations using a fine-tuned LLM, while mitigating the risk of sensitive data leakage. The method implements a two-phase solution: offline and online (inference time).

In the offline phase, an LLM is fine-tuned on sensitive data to improve match accuracy. The fine-tuned LLM is used to generate match explanations for target matches of search targets. The search targets may be queries from a domain-specific user application, to obtain target matches. The explanations are clustered using a topic analysis machine-learning model. For each topic cluster, a representative explanation template is generated using the fine-tuned LLM. The explanation template includes a static portion representing the general reasoning and a dynamic portion to be populated with user-specific data. The explanation templates are manually reviewed by a human-in-the-loop security team to ensure they do not contain sensitive information. The templates are then encoded into vector representations for later comparison.

In the online phase, or at inference time, when a new search target is received, the fine-tuned LLM generates a match and a corresponding explanation. The explanation is encoded and compared to the encoded templates using a similarity function, such as cosine similarity. The semantic similarity between the explanation and the nearest template is computed. If the semantic similarity satisfies a high similarity threshold, the explanation is considered safe, and a small language model (SLM) is used to populate the dynamic portion of the corresponding template using attributes from the search target. If the semantic similarity falls between the high similarity threshold, and a low similarity threshold, the explanation is added to a short-term memory queue for offline analysis and potential template generation. If the semantic similarity fails to satisfy the low similarity threshold, the explanation is flagged as a potential security threat and sent to a human-in-the-loop portal for manual review.

The approach described herein ensures that explanations remain generative and personalized while maintaining strict security controls. Continuous learning is built into the method, by periodically revisiting the short-term memory queue in iterations of the offline phase to update templates over time as new explanation patterns emerge.

Figure 1:
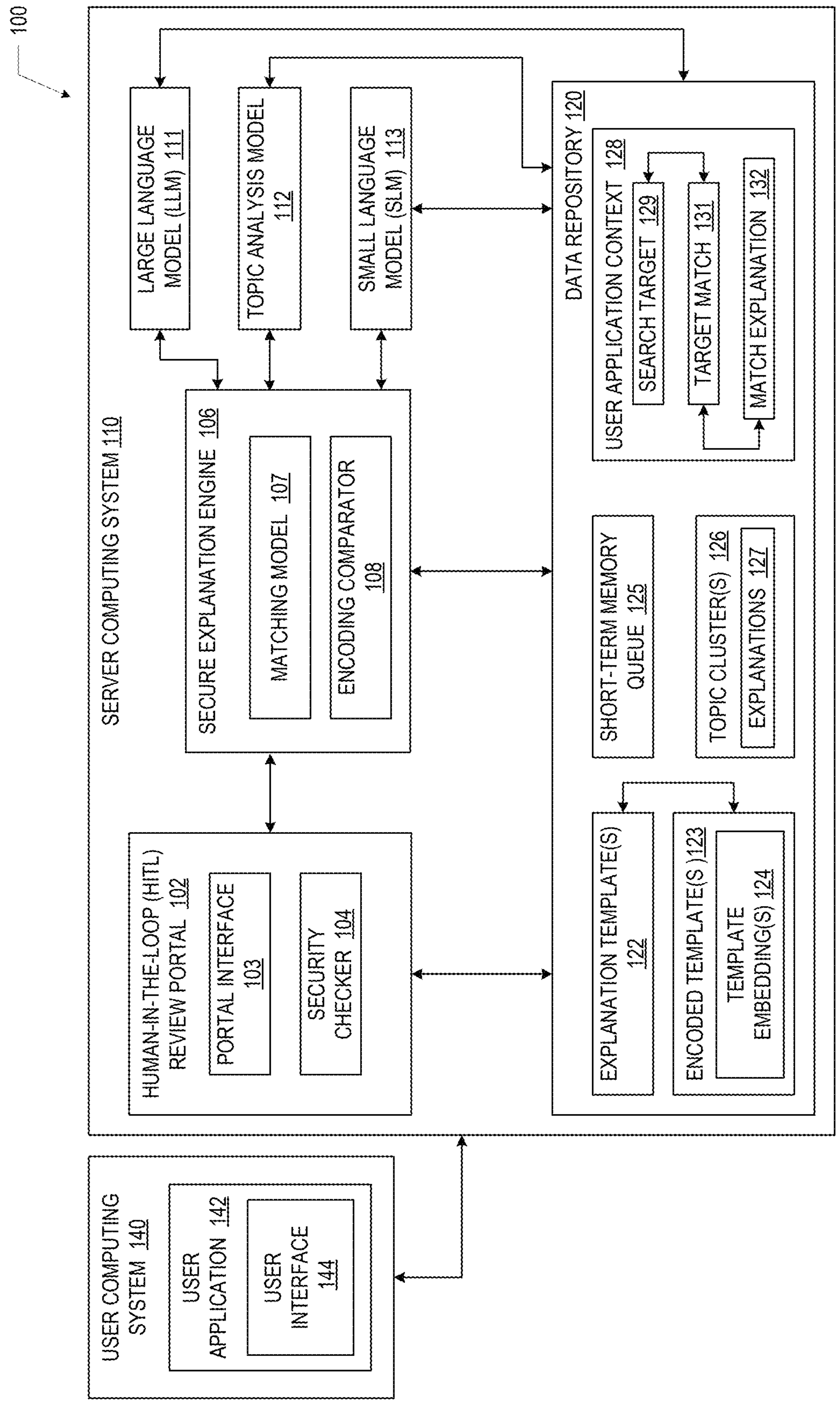
FIG. 1 shows a computing system, in accordance with one or more embodiments.

Attention is now turned to the figures. FIG. 1 shows a computing system, in accordance with one or more embodiments. The system shown in FIG. 1 may include a server computing system (110). The server computing system (110) is one or more computer processors, data repositories, communication devices, and supporting hardware and software. The server computing system (110) may be in a distributed computing environment. The server computing system (110) includes a computer processor. The computer processor is one or more hardware or virtual processors which may execute computer readable program code that defines one or more applications, such as the human-in-the-loop (HITL) review portal (102), the secure explanation engine (106), the large language model (LLM) (111), the topic analysis model (112), and the small language model (SLM) (113). An example of the computer processor is described with respect to the computer processor(s) (502) of FIG. 5A. Thus, the server computing system (110) is configured to execute one or more applications, such as the HITL review portal (102), the secure explanation engine (106), the LLM (111), the topic analysis model (112), and the SLM (113). An example of a computer system and network that may form the server computing system (110) is described with respect to FIG. 5A and FIG. 5B.

The server computing system (110) shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes a user application context (128). The user application context (128) is a capture of diverse elements of a user's interaction session. The user application context (128) may encapsulate the state and content of a user's interaction with the user application (142). The user application (142) may include a complex matching feature, which provides target matches and match explanations for a search target. Accordingly, the user application context (128) may include search target(s) (129), target match(es) (131), and match explanation(s) (132). The search target (129) is the input provided by the user to initiate a match request. The search target (129) may include data such as transaction details, invoice identifiers, or other domain-specific attributes relevant to the matching process. Notably, the search target (129) may include sensitive data, which must be protected from inadvertent exposure to other users of the system, or display in unprotected/public user application environments. The target match (131) is the result returned by the secure explanation engine in response to a search target, identifying the most relevant record or entity (e.g., an invoice or payment) that corresponds to the user's search target (129). One or more target matches (131) may correspond to a search target (129).

The user application context (128) further includes a match explanation (132). A match explanation (132) may correspond to a target match (131). The match explanation (132) is a natural language output generated by the LLM (111). The LLM (111) may be previously fine-tuned on domain-specific data, prior to deployment. The LLM (111) may generate a justification, or explanation, for why a particular target match was selected in response to a user's search target. The match explanation (132) may be human readable and contextually relevant. Notably, the match explanation (132) may reference and cite attributes such as transaction amounts, dates, vendor names, or invoice identifiers provided as part of the search target (129). Thus, the generated match explanation (132) may include sensitive fields (e.g., customer names, financial amounts, or dates). Accordingly, the match explanation (132) may be intended for display within an authenticated user application environment, where the user has appropriate access rights to the data referenced.

The user application context (128) may be stored in a human-readable and machine-readable format, such as a JavaScript Object Notation (JSON) document. Other examples of user application context (128) storage formats and structures may include records in a relational database, documents in a document-based storage system (e.g., MONGODB®, time-series or event-based storage systems such as Apache KAFKA®, or INFLUXDB®, etc.

The data repository (120) further includes topic clusters (126). The topic clusters (126) may further include explanations (127). In an offline processing phase, the secure explanation engine (105) may extract match explanations (132) from diverse user application context(s) (128). The extracted match explanations (132) may be further processed by the topic analysis model (112) to generate the topic clusters (126). A topic cluster (126) may include one or more match explanations, shown in FIG. 1 as the explanations (127). In one or more embodiments, the topic clusters (126) may be generated using embedding-based clustering techniques. That is, vector embeddings of the match explanations (132) may be clustered into a topic cluster (126) based on a similarity measure of vector embeddings, such as cosine similarity, Euclidean distance, etc. A topic cluster (126) may represent a distinct explanation pattern. Thus, a topic cluster (126) may serve to provide an explanation (127) that is representative of the distinct explanation pattern. The representative explanation (127) may be processed to generate an explanation template.

The data repository (120) further includes explanation template(s) (122). An explanation template (122) is a structured textual template for a match explanation of the basis, or rationale, of common types of target matches. An explanation template (122) may include a static portion, capturing the static reasoning behind a target match, for example, "match is based on vendor name and transaction amount." The explanation template (122) may further include a dynamic portion, encapsulating user-specific data and/or further natural language utterances articulating personalized reasoning of the target match. The explanation templates (122) serve as a security-aware scaffold for generating explanations. By separating sensitive data from reusable reasoning, the explanation templates (122) facilitate controlled generative behavior of the LLM (111). Further, during inference, the explanation templates (122) ensure that the match explanations displayed to a user conform to known, vetted, formats.

By enforcing compliance with the template format, unrestricted explanation generation may be disallowed. Thus, incorporation of anecdotal similarities and inadvertent sharing of sensitive data outside of authorized access boundaries may be prevented.

The data repository (120) further includes encoded templates (123). The encoded templates (123) are encoded versions of corresponding explanation templates (122). In one or more embodiments, the encoded templates (123) may include one or more vector representations, or template embeddings (124), of the explanation templates (122). When the explanation template (122) is generated, the explanation template (122) may be manually vetted by a human-in-the-loop (HITL) or security team to ensure that no sensitive data is exposed. The vetted explanation templates (122) may be further converted to one or more template embeddings (124), yielding corresponding encoded templates (123). Thus, there is a one-to-one correspondence between the explanation templates (122) and the encoded templates (123). The template embeddings (124) may be generated by an embedding model of the topic analysis model (112). During inference, the encoded templates (123) may be used for similarity comparison with generated match explanations (also encoded) from the LLM (111).

The data repository (120) further includes a short-term memory queue (125). The short-term memory queue (125) serves as a dynamic holding area within the data repository for explanations that do not sufficiently match existing explanation templates. During online inference, when a fine-tuned LLM generates an explanation for a match, the similarity of the explanation to pre-approved templates is computed, using cosine similarity, Euclidean distance, or other similarity functions. If the similarity score obtained from the computation falls between a predefined high similarity threshold, and a low similarity threshold, the explanation may be considered neither clearly safe nor clearly anomalous. In this case, the explanation may be temporarily stored in the short-term memory queue (125). The short-term memory queue (125) is used to monitor and analyze emerging explanation patterns without immediately discarding or exposing potentially sensitive content. Periodically, such as on a weekly basis, the explanations of the short-term memory queue (125) may undergo topic analysis in an iteration of the offline phase, to determine whether the explanations represent new, recurring patterns that may potentially indicate that a new template should be created. This continuous feedback mechanism supports continuous learning and template evolution while maintaining a strong security standard. The continuous feedback mechanism further acts as a buffer against cold-start risks. A cold start risk refers to a situation in which a new explanation may be generated by the fine-tuned LLM that does not match any existing template (i.e., the similarity score is below the low similarity threshold $\beta$). Because the explanation is new, there may not be a prior cluster or template against which to compare the explanation. As a result, a challenge arises in determining whether the explanation is a valid new pattern that should be added as a new template, or a potential anomaly or security threat (e.g., prompt injection or data leakage). Thus, the continuous feedback mechanism allows the system to adapt to novel user behaviors or transaction types without compromising data integrity or user privacy.

The server computing system (110) further includes a human-in-the-loop (HITL) review portal (102). The HITL review portal (102) is software or application-specific hardware, which, when executed by the computer processor, serves as an endpoint for human oversight into the system's decision-making pipeline. The HITL review portal (102) may be used for human reviews of match explanations and matches that fall outside predefined thresholds or raise security concerns. The HITL review portal (102) may include features to validate sensitive or anomalous outputs, thereby enhancing trust and compliance. The HITL review portal interfaces with the secure explanation engine (106) and the data repository (120).

The HITL review portal (102) further includes a portal interface (103). The portal interface (103) provides a graphical user interface through which reviewers may inspect flagged explanations, approve, or reject templates, and monitor system behavior. The portal interface (103) may further support workflows for manual validation.

The HITL review portal (102) further includes a security checker (104). In one or more embodiments, the security checker (104) may perform automated scans of explanations and templates to detect potential data leakage, prompt injection, or unauthorized access to sensitive information. The security checker (104) may apply rule-based and heuristic filters and/or other business logic to ensure that content passed to the user application for a particular user session is privileged exclusively to the particular user. In other words, sensitive data from diverse user sessions does not cross session boundaries.

The server computing system (110) further includes a secure explanation engine (106). The secure explanation engine (106) is software or application-specific hardware, which, when executed by the computer processor, essentially performs the method of FIG. 2. The secure explanation engine (106) may further control and coordinate execution of the HITL review portal (102), the LLM (111), the topic analysis model (112), and the SLM (113). More particularly, the secure explanation engine (106) may orchestrate the generation, vetting, and enhancement of match explanations.

The secure explanation engine (106) further includes a matching model (107). The matching model (107) is configured to match a search target, including one or more attributes and attribute values with a target match. Notably, the search target and the target match may originate from diverse schemas or data models. For example, the search target may originate from schemas related to invoicing, and the target match may originate from schemas related to bank transactions and other payment records. Thus, the matching model (107) may perform a cross-referencing matching operation to select the target match. In selecting the target match, the matching model (107) may prioritize certain fields of the search target over other fields. The prioritization may be explained, or reflected in the match explanation, by way of articulating the business logic, or criteria of the match. In one or more embodiments, the matching model (107) may be an AI agent that invokes the LLM (111) with a prompt including the search target as input, and an instruction to search diverse domain data sources to obtain a corresponding target match. Thus, the matching model (107) may use the fine-tuned LLM (111) to obtain a target match. In certain other embodiments, the matching model (107) may be a rule-based engine. In certain additional embodiments, the matching model (107) may be a machine-learning model, such as a classifier or retrieval-based model, trained on organizational data.

The secure explanation engine (106) further includes an encoding comparator (108). The encoding comparator (108) is configured to compute similarity scores between generated match explanations and pre-approved and reviewed explanation templates (122). The encoding comparator (108) may use embedding models such as Sentence-Bidirectional Encoder Representations from Transformer (BERT), or Ada embeddings from OpenAI to encode match explanations and explanation templates. The encoded explanation templates are stored in the data repository as the encoded templates (123). The encoding comparator (108) may use diverse similarity functions, for example, cosine similarity or Euclidean distance to compute similarity function values of a particular match explanation with an encoded template.

The server computing system (110) further includes an LLM (111). The LLM (111) is a transformer-based neural network trained on extensive corpora of textual data to perform natural language understanding and generation tasks. The LLM (111) is configured to generate contextually relevant explanations in response to input prompts. In certain embodiments, the LLM (111) may be fine-tuned on domain-specific or sensitive data to improve accuracy and relevance. The LLM (111) operates by encoding input sequences into high-dimensional embeddings and decoding them into coherent, human-readable text. As a result, the LLM (111) may generate match explanations or justifications, classification rationales, or other explanatory outputs. Examples of LLMs that may be further fine-tuned include Llama from Meta, ChatGPT from OpenAI, Claude from Anthropic, etc.

The server computing system (110) further includes a topic analysis model (112). The topic analysis model (112) is an unsupervised machine-learning model, configured to identify and group semantically similar explanations into topic clusters. The topic analysis model (112) may be configured to operate on embedded representations of explanation text, and apply unsupervised clustering techniques to detect recurring patterns. The topic clusters are used to derive explanation templates and may be monitored for emerging or anomalous explanation behaviors. In certain embodiments, the topic analysis model (112) may be implemented using Bidirectional Encoder Representations from Transformers (BERT) or similar transformer-based models. These transformer-based models have capabilities of generating high-quality sentence embeddings for semantic similarity analysis.

The server computing system (110) further includes an SLM (113). As known in the art of machine-learning, SLMs are transformer-based neural networks designed to perform constrained natural language generation tasks with reduced computational overhead. SLMs may be characterized by their smaller parameter count, lower latency, and reduced memory footprint when compared to large language models (LLMs). Accordingly, SLMs may be suitable for real-time or resource-sensitive applications. LLMs may be typically trained on a massive corpora and capable of handling complex reasoning and multi-turn dialogue. Unlike LLMs, SLMs may be optimized for simpler tasks such as template enhancement, prompt completion, or structured text generation. In certain embodiments, the SLM (113) may be used to generate secure, personalized explanations by combining pre-approved templates with user-specific data, without accessing or reproducing sensitive training data across a user session boundary. Delegating the final explanation generation to the SLM (113) may support security and performance goals. Examples of SLMs known include TinyLlama®, DistilGPT-2®, and FLAN-T5® Small. SLMs may be used as efficient generative language models in production-grade natural language processing systems.

The system (100) includes a user computing system (140). The user computing system (140) may be considered remote or local. A remote user computing system may be operated by a third-party (e.g., an end user of a chatbot) that does not control or operate the system of FIG. 1. Similarly, the organization that controls the other elements of the system of FIG. 1 may not control or operate the remote user computing system. Thus, a remote user computing system may not be considered part of the system of FIG. 1. In contrast, a local user computing system is operated under the control of the organization that controls the other components of the system of FIG. 1. Thus, a local user computing system may be considered part of the system of FIG. 1.

The user computing system (140) is a computing system used by a user to submit a user query. The user computing system (140) may include a display for displaying the user interface (144) of a user application (142) and an input device for receiving input from the user. The user computing system (140) may further include a network interface for connecting the user computing system (140) to the server computing system (110). The user computing system (140) may be configured to execute the user application (142) with the user interface (144). In one or more embodiments, the user application (142) may be a web-based client application, operating within a web browser. Other embodiments of the user application (142) may include native desktop applications, mobile applications, remote desktop clients, etc. The user application (142) may be serviced by one or more SaaS applications executing on the server computing system (110). For example, the SaaS application may be an office productivity based application (e.g., OFFICE 365®), a graphics based application, a financial application (e.g., QUICKBOOKS®), a multi-media application, or other type of application.

While FIG. 1 shows a configuration of components, other configurations may be used without departing from the scope of one or more embodiments. For example, various components may be combined to create a single component. As another example, the functionality performed by a single component may be performed by two or more components.

Figure 2:
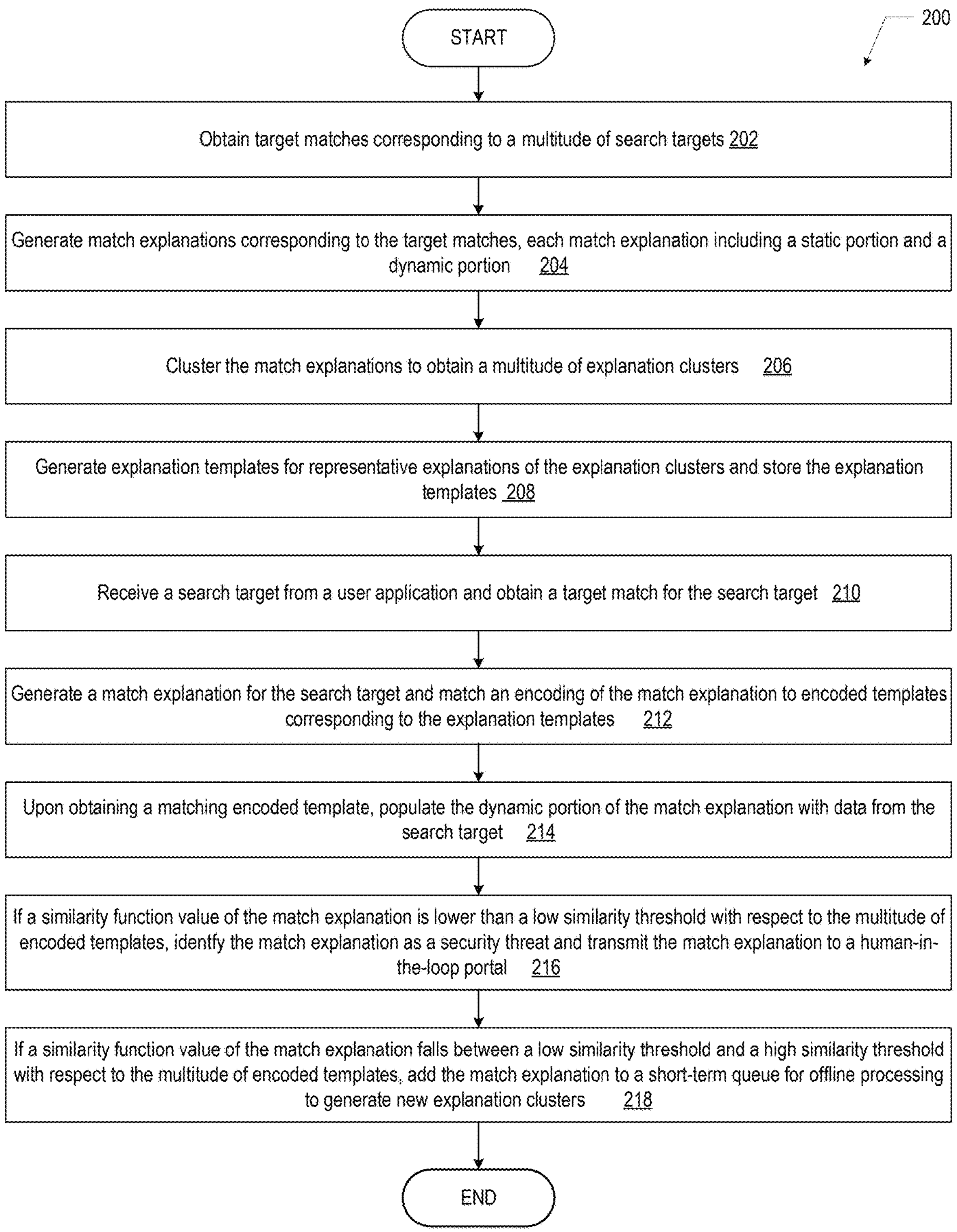
FIG. 2 shows a flowchart of a method, in accordance with one or more embodiments.

FIG. 2 shows a flowchart 200 of a method for generating a secure explanation for a target match of a search target, in accordance with one or more embodiments. The method of FIG. 2 encompasses an offline phase and an online phases, and may be implemented using the system of FIG. 1. One or more of the steps of the method of FIG. 2 may be performed on or received at one or more computer processors. While the various steps in flowchart 200 are presented and described sequentially, at least some of the steps may be executed in different orders, may be combined, or omitted, and at least some of the steps may be executed in parallel. Furthermore, the steps may be performed actively or passively.

In the flowchart 200, Blocks 202-208 may constitute an offline phase of the method. In the offline phase, existing search targets may be processed to obtain target matches. Explanations may be generated for the target matches, and further processed to obtain a "baseline" set of explanation templates. The baseline set of explanation templates, and the fine-tuned LLM may be deployed in a production system. Blocks 210-218 may constitute an online phase of the method. Here, a new (unseen) search target may be received in the production system, and a target match and corresponding match explanation may be generated. The match explanation may further undergo a vetting process, encompassing comparison with existing explanation templates. Based on the comparison results, a decision system may determine if the explanation may be instantiated with sensitive data and transmitted to the user application. The decision system further incorporates a feedback mechanism for the LLM to learn new explanation templates corresponding to new matching patterns. Thus, the online phase provides a feedback mechanism, for the offline phase to incorporate on a periodic basis.

In Block 202, target matches corresponding to a multitude of search targets are obtained. In one or more embodiments, the matching model of the secure explanation engine may retrieve a multitude of target matches for the multitude of search targets. In one or more embodiments, the matching model may invoke the fine-tuned LLM to generate the target matches. The search targets may be aggregated from diverse previously generated user application contexts.

In Block 204, match explanations corresponding to the target matches are generated. Each match explanation includes a static portion and a dynamic portion. In one or more embodiments, the LLM may generate a multitude of match explanations for the multitude of search targets. Each match explanation may include a natural language utterance as the static portion, and at least one attribute and corresponding attribute value of a corresponding search target as the dynamic portion. The LLM may be fine-tuned to generate match explanations for target matches of search targets based on attributes and attribute values of the search targets.

In Block 206, the match explanations are clustered to obtain a multitude of explanation clusters. In one or more embodiments, the topic analysis model may cluster the multitude of match explanations to obtain the multitude of explanation clusters.

In Block 208, explanation templates for representative explanations of the explanation clusters are generated and the explanation templates are stored. The explanation templates may be stored in the data repository. In one or more embodiments, the LLM may generate an explanation template for an explanation cluster of the multitude of explanation clusters. The explanation template may include a static portion and a dynamic portion. The secure explanation engine may compute an average value of encodings corresponding to respective match explanations of the explanation cluster to obtain a cluster centroid. The secure explanation engine may further compute similarity function values of the encodings of the respective match explanations of the explanation cluster and the cluster centroid to determine a highest similarity function value. A second encoding from the encodings of respective match explanations of the explanation cluster having the highest similarity function value with respect to the cluster centroid may be selected. A match explanation of the explanation cluster corresponding to the second encoding may be identified. Sensitive data in the match explanation may be replaced with corresponding placeholders to obtain the explanation template.

In Block 210, a search target is received from a user application and a target match for the search target is obtained. In one or more embodiments, the matching model of the secure explanation engine may obtain a target match for a search target received from a user application.

In Block 212, a match explanation for the search target is generated and an encoding of the match explanation is matched to encoded templates corresponding to the explanation templates. In one or more embodiments, the LLM may generate a corresponding match explanation for the target match. The encoding of the corresponding match explanation may be matched to a multitude of encoded templates corresponding to the multitude of explanation templates. The secure explanation engine may compute similarity function values of the encoding and respective encoded templates of the multitude of encoded templates to determine a highest similarity function value and a corresponding respective encoded template. Responsive to the highest similarity function value satisfying a high similarity threshold, the corresponding respective encoded template may be identified as a match of the encoding.

In Block 214, on obtaining a matching encoded template, the dynamic portion of the match explanation is populated with data from the search target. In one or more embodiments, responsive to the encoding matching an encoded template of the multitude of encoded templates, the small language model (SLM) may be used to populate the corresponding match explanation from the search target. More particularly, the placeholders for the attributes of the search target may be populated with corresponding attribute values from the search target. For example, if the explanation includes "This bank transaction matches Invoice [INVOICE_ID] issued to [PAYEE_NAME] for [AMOUNT] on [INVOICE_DATE]," then the placeholders [INVOICE ID], [PAYEE_NAME], etc., may be replaced with attribute values corresponding to the like-named attributes. Thus, [INVOICE_ID} may be replaced with "INV_2048," [PAYEE_NAME] may be replaced with "Acme Supplies." etc. The resulting populated explanation template may be "This bank transaction matches Invoice #INV-2048 issued to Acme Supplies for $1,250.00 on Jul. 10, 2025, as the amount and payee name align, and the invoice was previously marked as unpaid."

In Block 216, if a similarity function value of the match explanation is lower than a low similarity threshold with respect to the multitude of encoded templates, the match explanation is identified as a security threat and transmitted to a human-in-the-loop portal. In one or more embodiments, the secure explanation engine may compute similarity function values of the encoding and respective encoded templates of the multitude of encoded templates. A highest similarity function value of the similarity function values may be determined. A corresponding respective encoded template of the highest similarity function value may be identified. Responsive to the highest similarity function value failing to satisfy a low similarity threshold, the corresponding match explanation may be identified as a security threat and transmitted to a human-in-the-loop portal.

In Block 218, if the similarity function value falls between the low similarity threshold and the high similarity threshold, the match explanation is added to a short-term memory queue for offline processing. In one or more embodiments, the secure explanation engine may compute similarity function values of the encoding and respective encoded templates of the multitude of encoded templates to determine a highest similarity function value and a corresponding respective encoded template. Responsive to the highest similarity function value satisfying a low similarity threshold and failing to satisfy a high similarity threshold, the corresponding match explanation may be added to a short-term memory queue. The low similarity threshold may be less than the high similarity threshold. The topic analysis model may retrieve a multitude of match explanations from the short-term memory queue. The topic analysis model may cluster the multitude of match explanations to obtain a second multitude of explanation clusters. The LLM may generate a second multitude of explanation templates from the second multitude of explanation clusters.

Figure 3:
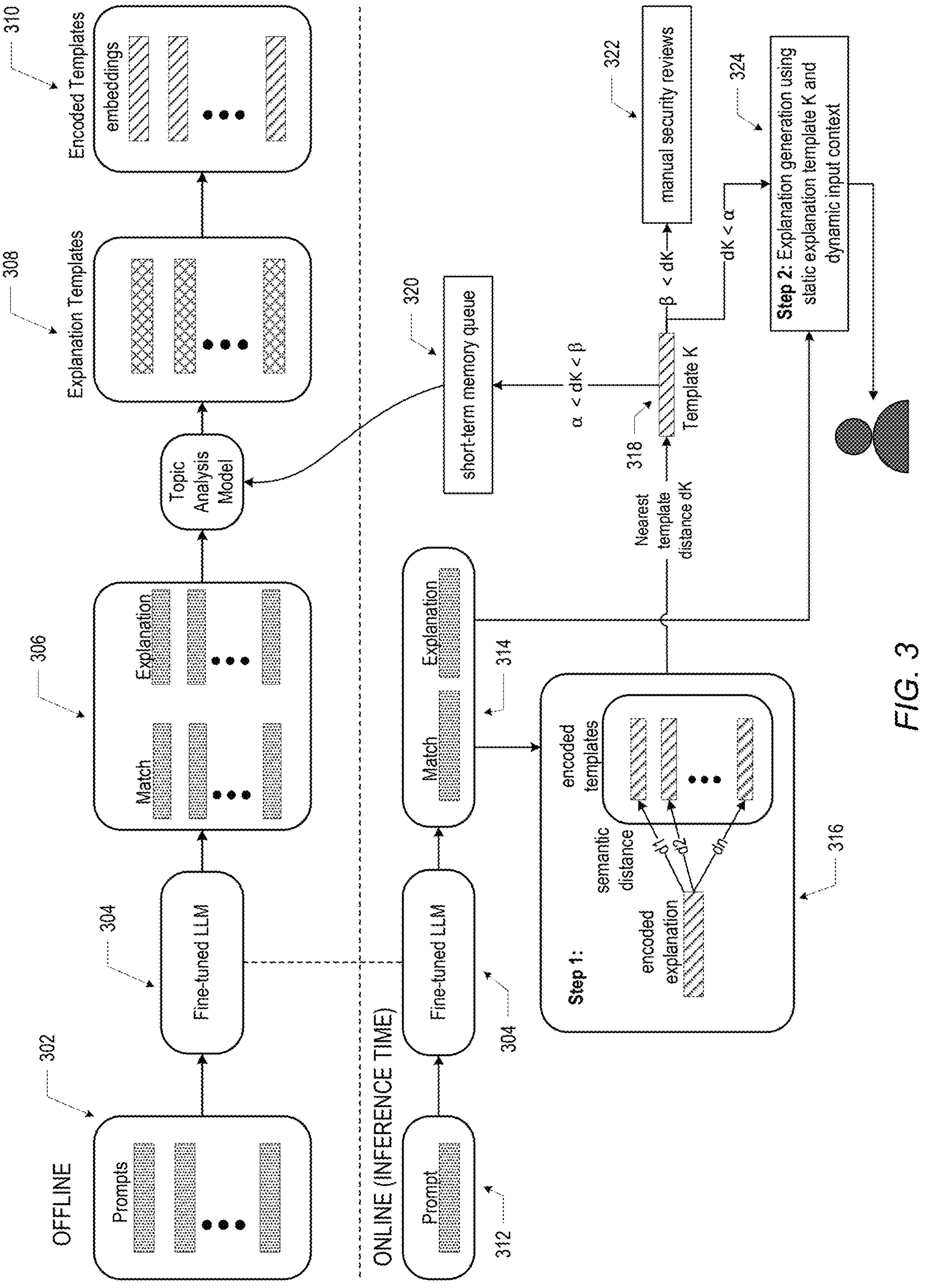
FIG. 3 shows an example implementation, in accordance with one or more embodiments.

FIG. 3 shows an example implementation of the method of FIG. 2, in accordance with one or more embodiments. The following example is for explanatory purposes only and not intended to limit the scope of one or more embodiments.

In Block 302, a multitude of prompts is provided. In one or more embodiments, the prompts may correspond to various user inputs or transaction scenarios used to train a fine-tuned large language model (LLM) for generating match recommendations and explanations. These prompts may be representative of real-world use cases, such as matching business accounting application transactions to bank transaction entries. Thus, the prompts serve as the target matches for which match explanations are to be generated.

In Block 304, the multitude of prompts are processed by a fine-tuned LLM. In one or more embodiments, the LLM may be fine-tuned on sensitive organizational data to improve the accuracy of match recommendations and associated explanations. The fine-tuning enhances the LLM's capabilities in the domain, while introducing a risk of sensitive data leakage.

In Block 306, matched items and corresponding explanations are generated by the fine-tuned LLM. In one or more embodiments, the fine-tuned LLM may produce a corresponding explanation, and generate a match for each prompt. The explanation may include a static portion that reflects the general reasoning or topic of the match, and a dynamic portion that includes user-specific attributes such as transaction amount, date, or vendor name.

In Block 308, explanation templates are generated based on the explanations. In one or more embodiments, topic analysis may be performed by the topic analysis model on the multitude of explanations to identify clusters of similar explanations. For each cluster, an LLM may be used to generate a representative explanation template. Each explanation template may include a static portion derived from the cluster and a dynamic portion to be populated at inference time. Sensitive data may be removed or replaced with placeholders during template generation. The templates may be manually reviewed and approved by a human-in-the-loop security team.

In Block 310, the explanation templates are encoded to obtain a multitude of encoded templates. In one or more embodiments, each explanation template may be converted into a vector representation using an embedding model. The encoded templates may be stored for use during inference time to compare against newly generated explanations.

In Block 312, a prompt is received during inference time. In one or more embodiments, the prompt may be received from a user application and may include a transaction or other input requiring a match and explanation. The prompt is processed by the same fine-tuned LLM used during the offline phase. In one or more embodiments, the LLM may generate a match and a corresponding explanation for the prompt, leveraging the patterns learned during fine-tuning.

In Block 314, a match and explanation are generated for the prompt. In one or more embodiments, the explanation may again include a static portion and a dynamic portion, with the dynamic portion reflecting user-specific data.

In Block 316, the explanation is encoded and compared to the multitude of encoded templates to compute semantic distances. In one or more embodiments, the explanation may be converted into an embedding, and a similarity function such as cosine similarity may be used to compute distances between the encoded explanation and each encoded template. The semantic distance is inversely related to the similarity score, a smaller semantic distance indicates a higher similarity. The nearest template distance, denoted as dK, may be identified.

In Block 318, the nearest template distance dK is evaluated against predefined distance thresholds, $\alpha$ (alpha) and $\beta$ (beta). In one or more embodiments, if the semantic distance dK is less than $\alpha$, the explanation is considered sufficiently similar to a known template. If dK is greater than $\beta$, the explanation is considered dissimilar and potentially indicative of a security threat. If dK falls between $\alpha$ and $\beta$, the explanation may represent a novel pattern or an ambiguous case.

In Block 324, if $dK<\alpha$, a secure explanation is generated using the static explanation template and the dynamic input context. In one or more embodiments, a small language model (SLM) may be used to populate the dynamic portion of the explanation template with user-specific data. This approach maintains the generative nature of the explanation while mitigating the risk of sensitive data leakage. The use of an SLM, such as TinyLlama, may optimize for latency and cost.

In Block 320, if $\alpha<dK<\beta$, the explanation is added to a short-term memory queue for offline processing. The short-term memory queue serves as the feedback mechanism between the offline and online processes. In one or more embodiments, explanations in the short-term memory queue may be periodically analyzed using topic analysis to identify emerging explanation patterns. New templates may be generated from these patterns and added to the template set after manual review.

In Block 322, if $dK>\beta$, the explanation is identified as a potential security threat and transmitted to a human-in-the-loop portal for manual review. In one or more embodiments, this process ensures that explanations which deviate significantly from known templates are not shown to users, thereby preventing potential leakage of sensitive training data.

Figure 4:
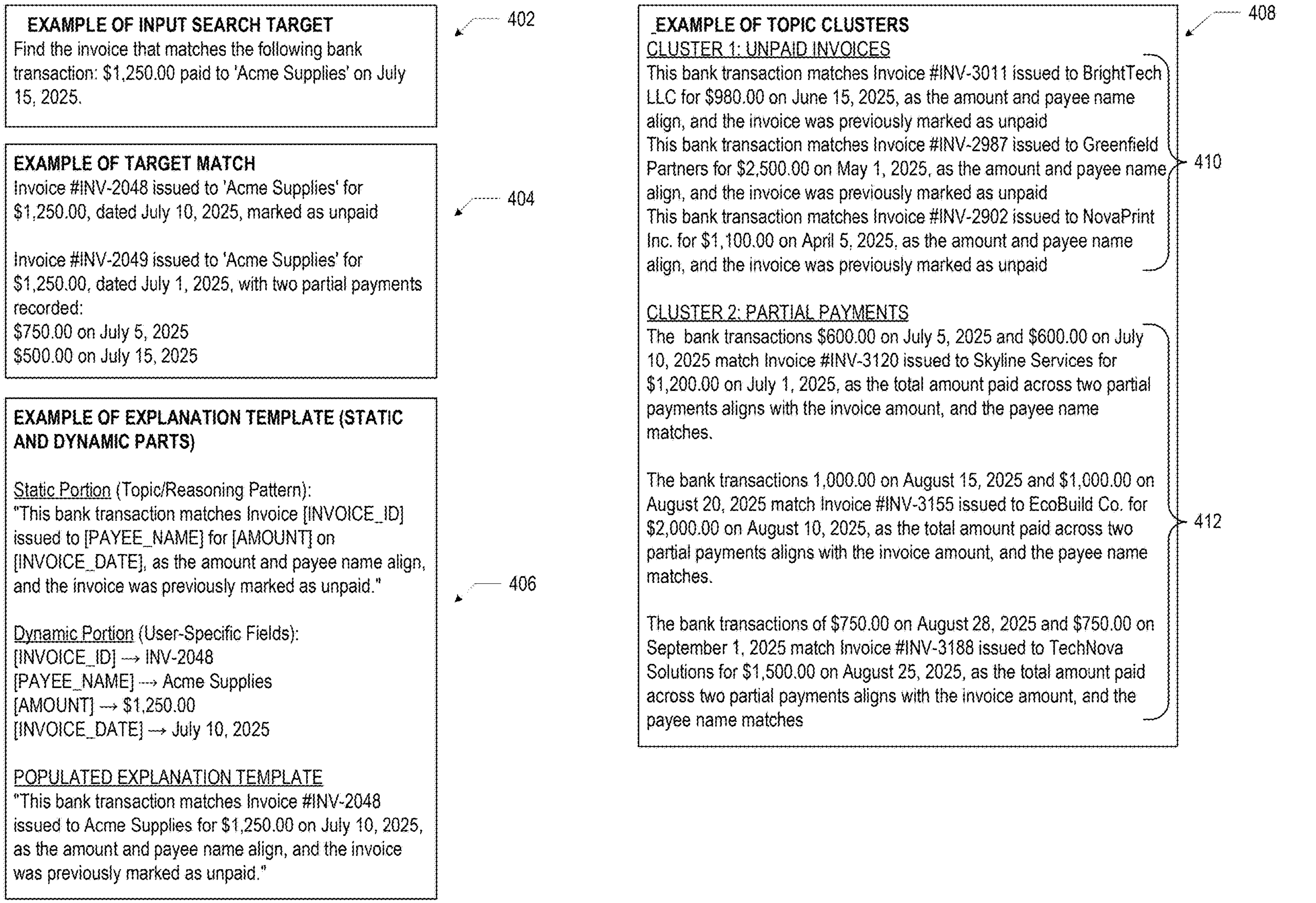
FIG. 4 shows examples of matches and explanations, in accordance with one or more embodiments.

FIG. 4 shows examples of a search target, a target match, and a match explanation, and further an example of topic clusters, in accordance with one or more embodiments. The following example is for explanatory purposes only and not intended to limit the scope of one or more embodiments.

In Block 402, an example of an input search target is provided. This block shows a user query intended to identify an invoice corresponding to a specific bank transaction. The example search target reads: "Find the invoice that matches the following bank transaction: $1,250.00 paid to 'Acme Supplies' on Jul. 15, 2025." This input serves as the basis for subsequent matching and explanation generation.

In Block 404, two example target matches are presented in response to the search target from Block 402. The first match is Invoice #INV-2048, issued to Acme Supplies for $1,250.00, dated Jul. 10, 2025, and marked as "unpaid." The second match is Invoice #INV-2049, also issued to Acme Supplies for $1,250.00, dated Jul. 1, 2025, with two partial payments recorded: $750.00 on Jul. 5, 2025, and $500.00 on Jul. 15, 2025. This block is representative on the types of target matches that may be retrieved for a search target.

In Block 406, an example explanation template is shown, illustrating how the system generates a natural language explanation for a matched invoice. The block is divided into three components. The first component shows a static portion of the explanation, which defines a reusable reasoning pattern, namely, "This bank transaction matches Invoice [INVOICE_ID] issued to [PAYEE_NAME] for [AMOUNT] on [INVOICE_DATE], as the amount and payee name align, and the invoice was previously marked as unpaid." The static portion includes placeholders for the sensitive data that anchors the match, which is required to be populated for presentation to users with authorized access. The second component shows a dynamic portion, which includes user-specific fields such as [INVOICE ID], [PAYEE_NAME], [AMOUNT], and [INVOICE_DATE], and corresponding field values. The third component of Block 406 is the populated explanation template, with dynamic fields filled using data from Invoice #INV-2048. The result is the output "This bank transaction matches Invoice #INV-2048 issued to Acme Supplies for $1,250.00 on Jul. 10, 2025, as the amount and payee name align, and the invoice was previously marked as unpaid."

In Block 408, examples of topic clusters are provided to illustrate how explanations can be grouped based on reasoning patterns. Block 408 is subdivided into Section 410 and Section 412. Section 410 presents Cluster 1: Unpaid Invoices, which includes three examples of invoices that were matched based on exact amount and unpaid status. Section 412 presents Cluster 2: Partial Payments, which includes examples where the total amount of multiple bank transactions matches the invoice amount.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
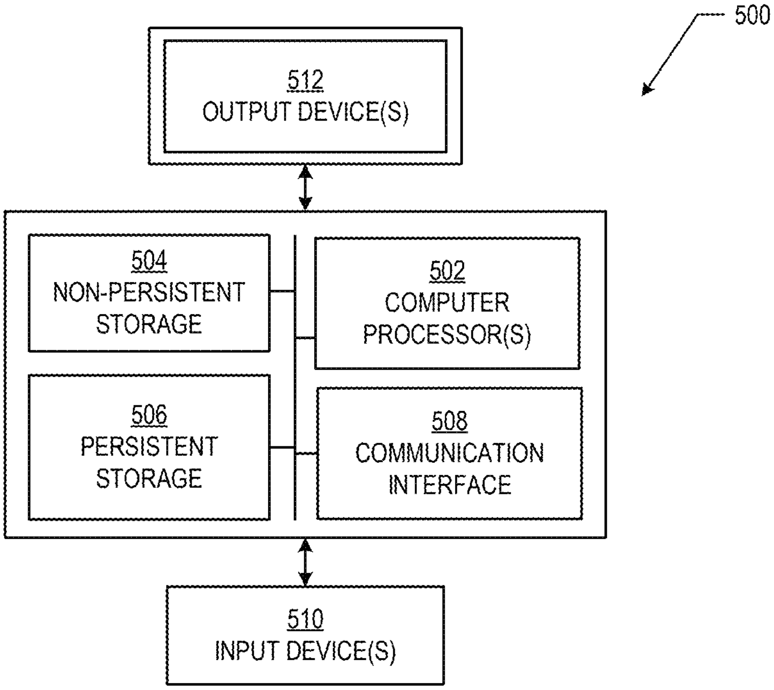
FIGS. 5A and 5B show an example of a computing system, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
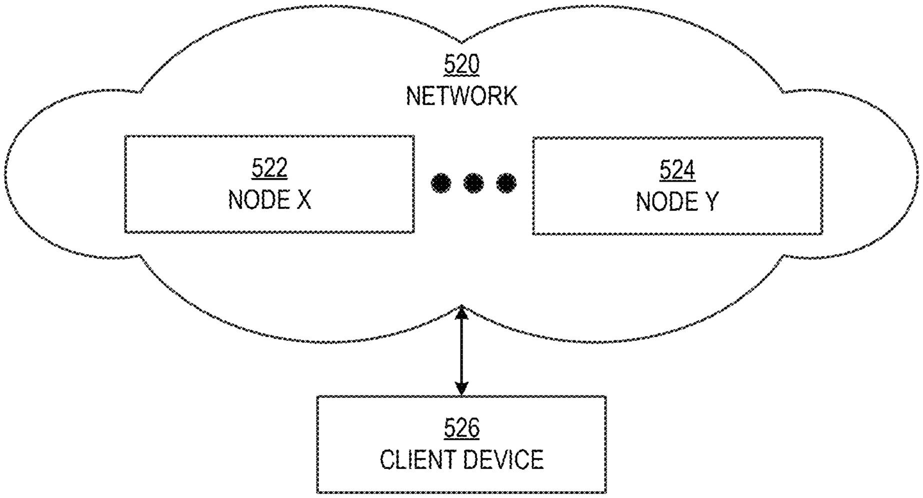

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

generating, by a large language model (LLM), a plurality of match explanations for a plurality of search targets;

clustering the plurality of match explanations to obtain a plurality of explanation clusters;

generating an explanation template for an explanation cluster of the plurality of explanation clusters to obtain a plurality of explanation templates;

obtaining a target match for a search target received from a user application;

generating, by the LLM, a corresponding match explanation for the target match;

matching an encoding of the corresponding match explanation to a plurality of encoded templates corresponding to the plurality of explanation templates;

responsive to the encoding matching an encoded template of the plurality of encoded templates, populating, by a small language model (SLM), the corresponding match explanation from the search target according to a format defined in the encoded template:

transmitting the corresponding match explanation to a human-in-the-loop (HITL) portal;

scanning, by a security checker employing a plurality of filters in the HITL portal, the corresponding match explanation to identify a security threat and to ensure a content in the corresponding match explanation passed to the user application for a particular user session is privileged exclusively to the particular user session; and returning the content to the user session.

2. The method of claim 1, wherein generating the plurality of match explanations further comprises:

obtaining a plurality of target matches for the plurality of search targets, and generating, for a second target match of the plurality of target matches, a match explanation comprising a natural language utterance as a static portion, and at least an attribute and corresponding attribute value of a corresponding search target as a dynamic portion, to obtain the plurality of match explanations.

3. The method of claim 1, further comprising:

matching the encoding of the corresponding match explanation by performing operations comprising:

computing similarity function values of the encoding and respective encoded templates of the plurality of encoded templates to determine a highest similarity function value and a corresponding respective encoded template, and responsive to the highest similarity function value satisfying a high similarity threshold, identifying the corresponding respective encoded template as the encoded template matching the encoding.

4. The method of claim 1, further comprising:

matching the encoding of the corresponding match explanation by performing operations comprising:

computing similarity function values of the encoding and respective encoded templates of the plurality of encoded templates to determine a highest similarity function value and a corresponding respective encoded template, responsive to the highest similarity function value failing to satisfy a low similarity threshold, and displaying the corresponding match explanation as the security threat in the human-in-the-loop (HITL) portal.

5. The method of claim 1, further comprising:

matching the encoding of the corresponding match explanation by performing operations comprising:

computing similarity function values of the encoding and respective encoded templates of the plurality of encoded templates to determine a highest similarity function value and a corresponding respective encoded template, and responsive to the highest similarity function value satisfying a low similarity threshold and failing to satisfy a high similarity threshold, wherein the low similarity threshold is less than the high similarity threshold, adding the corresponding match explanation to a short-term memory queue.

6. The method of claim 5, further comprising:

retrieving, by a topic analysis model, a second plurality of match explanations from the short-term memory queue;

clustering, by the topic analysis model, the second plurality of match explanations to obtain a second plurality of explanation clusters; and generating, by the LLM, a second plurality of explanation templates from the second plurality of explanation clusters.

7. The method of claim 1, further comprising:

generating the explanation template corresponding to the explanation cluster of the plurality of explanation clusters by performing operations comprising:

computing an average value of encodings corresponding to respective match explanations of the explanation cluster to obtain a cluster centroid, and evaluating similarity function values of the encodings corresponding to the respective match explanations of the explanation cluster and the cluster centroid to determine a highest similarity function value.

8. The method of claim 7, further comprising:

selecting a second encoding from the encodings corresponding to the respective match explanations of the explanation cluster having the highest similarity function value with respect to the cluster centroid;

identifying a match explanation of the explanation cluster corresponding to the second encoding; and replacing sensitive data in the match explanation with corresponding placeholders, to obtain the explanation template.

9. The method of claim 1, further comprising:

populating, by the SLM, a dynamic portion of the explanation template, by replacing placeholders in the dynamic portion with corresponding attribute values from the search target, wherein the search target comprises attributes and attribute values and the placeholders correspond to at least a portion of the attributes.

10. The method of claim 1, wherein the LLM is fine-tuned to generate match explanations for target matches of search targets based on attributes and attribute values of the search targets.

11. A system, comprising:

a computer processor;

a large language model (LLM), executing on the computer processor;

a small language model (SLM), executing on the computer processor;

a topic analysis model, executing on the computer processor; and a secure explanation engine, executing on the computer processor, interfacing with the LLM, the SLM, and the topic analysis model, and configured for:

generating, using the LLM, a plurality of match explanations for a plurality of search targets, clustering, using the topic analysis model, the plurality of match explanations to obtain a plurality of explanation clusters, generating, using the LLM, an explanation template for an explanation cluster of the plurality of explanation clusters to obtain a plurality of explanation templates, obtaining, by a matching model of the secure explanation engine, a target match for a search target received from a user application, generating, using the LLM, a corresponding match explanation for the target match, matching an encoding of the corresponding match explanation to a plurality of encoded templates corresponding to the plurality of explanation templates;

responsive to the encoding matching an encoded template of the plurality of encoded templates, populating, by a small language model (SLM), the corresponding match explanation from the search target according to a format defined in the encoded template;

transmitting the corresponding match explanation to a human-in-the-loop (HITL) portal;

scanning, by a security checker employing a plurality of filters in the HITL portal, the corresponding match explanation to identify a security threat and to ensure a content in the corresponding match explanation passed to the user application for a particular user session is privileged exclusively to the particular user session; and returning the content to the user session.

12. The system of claim 11, further configured for:

obtaining, by the matching model of the secure explanation engine, a plurality of target matches for the plurality of search targets, and generating, by the LLM, for a second target match of the plurality of target matches, a match explanation comprising a natural language utterance as a static portion, and at least an attribute and corresponding attribute value of a corresponding search target as a dynamic portion, to obtain the plurality of match explanations.

13. The system of claim 11, further configured for:

matching the encoding of the corresponding match explanation by performing operations comprising:

computing, by the secure explanation engine, similarity function values of the encoding and respective encoded templates of the plurality of encoded templates to determine a highest similarity function value and a corresponding respective encoded template, and responsive to the highest similarity function value satisfying a high similarity threshold, identifying the corresponding respective encoded template as the encoded template matching the encoding.

14. The system of claim 11, further configured for:

matching the encoding of the corresponding match explanation by performing operations comprising:

computing, by the secure explanation engine, similarity function values of the encoding and respective encoded templates of the plurality of encoded templates to determine a highest similarity function value and a corresponding respective encoded template, and responsive to the highest similarity function value failing to satisfy a low similarity threshold, and the displaying the corresponding match explanation as the security threat in the human-in-the-loop (HITL) portal.

15. The system of claim 11, further configured for:

matching the encoding of the corresponding match explanation by performing operations comprising:

computing similarity function values of the encoding and respective encoded templates of the plurality of encoded templates to determine a highest similarity function value, and a corresponding respective encoded template, and responsive to the highest similarity function value satisfying a low similarity threshold and failing to satisfy a high similarity threshold, wherein the low similarity threshold is less than the high similarity threshold, and adding the corresponding match explanation to a short-term memory queue.

16. The system of claim 15, further configured for:

retrieving, by the topic analysis model, a second plurality of match explanations from the short-term memory queue, clustering, by the topic analysis model, the second plurality of match explanations to obtain a second plurality of explanation clusters, and generating, by the LLM, a second plurality of explanation templates from the second plurality of explanation clusters.

17. The system of claim 11, further configured for generating the explanation template corresponding to the explanation cluster of the plurality of explanation clusters by performing operations comprising:

computing, by the secure explanation engine, an average value of encodings corresponding to respective match explanations of the explanation cluster to obtain a cluster centroid, and computing, by the secure explanation engine, similarity function values of the encodings corresponding to the respective match explanations of the explanation cluster and the cluster centroid to determine a highest similarity function value.

18. The system of claim 17, further configured for:

selecting a second encoding from the encodings corresponding to the respective match explanations of the explanation cluster having the highest similarity function value with respect to the cluster centroid, identifying a match explanation of the explanation cluster corresponding to the second encoding, and replacing sensitive data in the match explanation with corresponding placeholders, to obtain the explanation template.

* * * * *